Aug. 17, 1965  H. C. SWIFT  3,200,909
AUTOMATIC BRAKE ADJUSTING MECHANISM
Filed July 9, 1963  2 Sheets-Sheet 1

INVENTOR.
Harvey C. Swift.
BY
Harness, Dickey & Pierce
ATTORNEYS

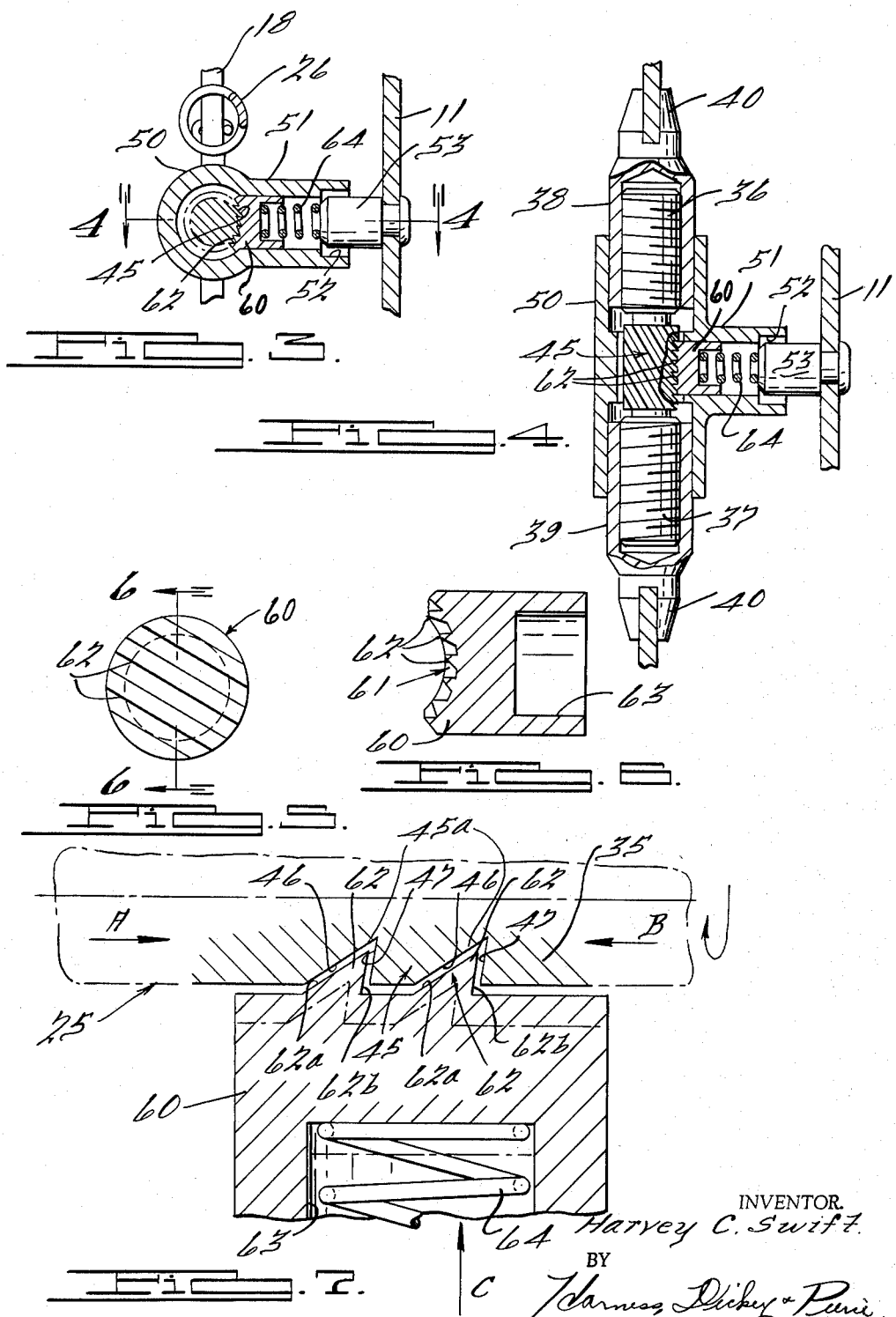

United States Patent Office 3,200,909
Patented Aug. 17, 1965

3,200,909
AUTOMATIC BRAKE ADJUSTING MECHANISM
Harvey C. Swift, Birmingham, Mich., assignor to Kelsey-Hayes Company, Romulus, Mich., a corporation of Delaware
Filed July 9, 1963, Ser. No. 293,810
4 Claims. (Cl. 188—79.5)

This invention relates to brakes of the type comprising an annular brake drum and arcuate brake shoes and, more particularly, to means for automatically adjusting the brakes when the wear on the brake shoes requires such adjustment.

One of the principal objects of this invention is to provide wholly automatic adjusting means controlled by excessive movement of the brake shoes due to wear on the linings thereof.

Another object of the invention is to provide an automatic adjuster for the brake shoes adapted to prevent overadjustment of the brake shoes under all conditions.

A further object of this invention is to provide an adjusting means for the break shoes wherein the difference in the rate of wear on the primary and secondary shoes can be compensated for by differentially adjusting said shoes.

Still another object of the invention is to provide automatic adjusting means of this type which is rendered operative when the vehicle is moving in a forward direction, but which does not affect the normal operation of the brake when applied during the forward movement of the vehicle if there has not been any excessive wear on the brake linings.

A still further object of the invention is to provide a device of this type wherein its structural simplicity produces a substantial economy in its manufacturing, installation and maintenance costs.

Figure 1:
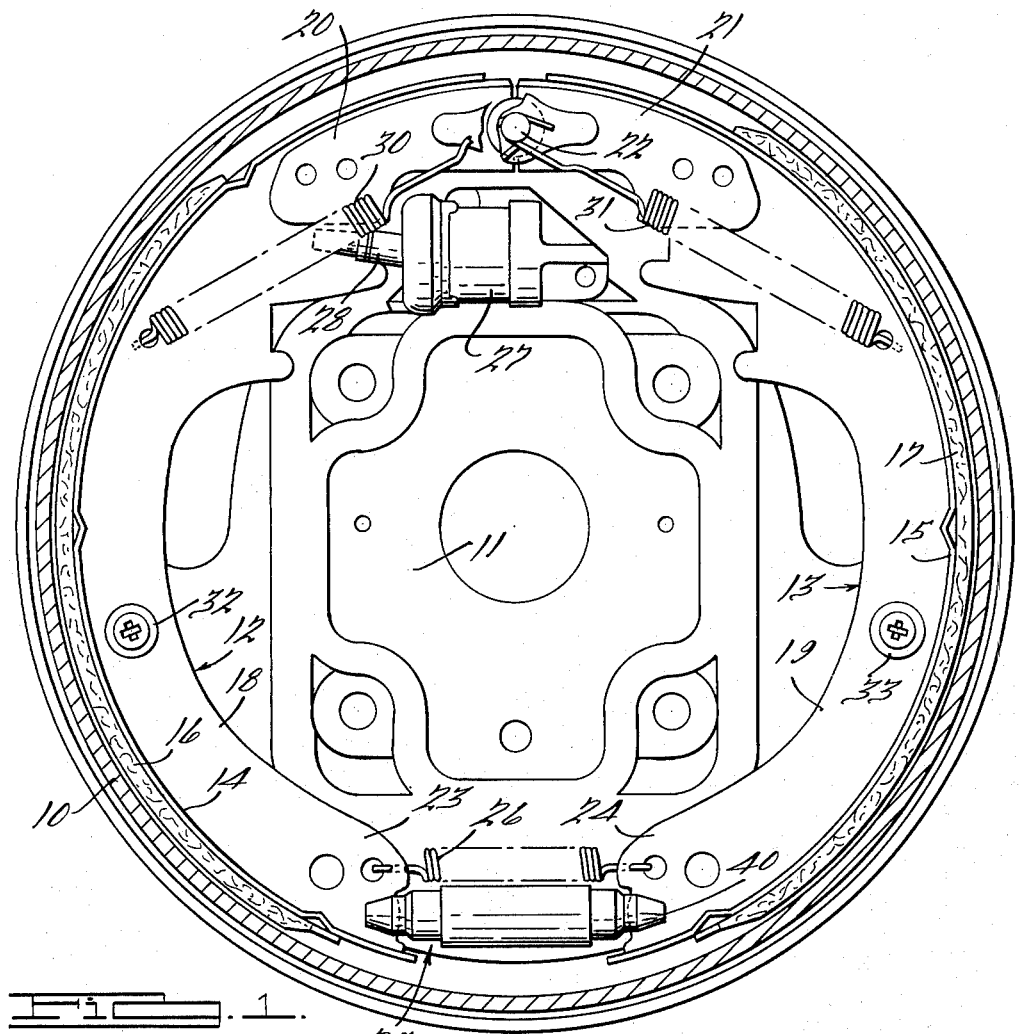
Figure 2:
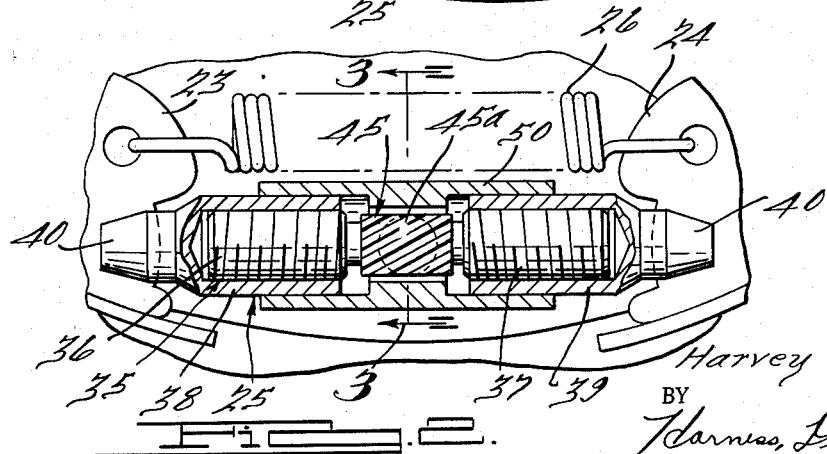

The various objects and advantages, and the novel details of construction of one commercially practical embodiment of the invention will become more apparent as this description proceeds, especially when considered in connection with the accompanying drawings, in which:

FIGURE 1 is a sectional elevational view of a brake incorporating the features of this invention, FIGURE 2 is an enlarged fragmentary sectional elevational view showing the automatic adjusting mechanism, FIGURE 3 is a sectional view taken substantially on the plane indicated by line 3—3 in FIGURE 2, FIGURE 4 is a horizontal sectional view taken substantially on the plane indicated by line 4—4 in FIGURE 3, FIGURE 5 is an end view of the pawl member, FIGURE 6 is a detail sectional view of the pawl member, and FIGURE 7 is an enlarged diagrammatic view of a portion of the strut and the pawl member showing the manner in which the adjustment is accomplished.

The illustrative embodiment of the invention is shown in the drawings as applied to a brake structure of the internal expanding type comprising arcuate brake shoes adapted to cooperate with the inner surfaces of the brake drum. In FIGURE 1, the reference character 10 indicates a brake drum mounted on the wheel hub of a vehicle (not shown) for rotation therewith. A stationary backing plate 11 is mounted on a stationary part (not shown) of the vehicle.

The basic elements of the brake structure comprise a pair of brake shoes 12 and 13, in the embodiment illustrated, the brake shoe 12 constituting the primary shoe and the brake shoe 13 constituting the secondary shoe. These brake shoes are in the form of arcuate segments, each being provided with arcuate rim portions 14 and 15, respectively, supporting lining elements 16 and 17. The rim portions 14 and 15 are reinforced against flexure by web portions 18 and 19 extending perpendicularly from the rim portions 14 and 15.

The adjacent ends 20 and 21 of the brake shoes 12 and 13 engage an anchor pin 22 fixed to the backing plate 11. The opposite ends 23 and 24 of the brake shoes 12 and 13 engage an adjustable strut 25, with the shoe ends 23 and 24 being retained in engagement with the adjusting strut by means of a tension spring 26.

The invention is shown as illustrated with a so-called uni-servo type of brake in which the wheel cylinder 27 has a plunger 28 engaging the web 18 of the primary brake shoe 12 for moving the brake shoe 12 into engagement with the brake drum 10. The secondary shoe 13, in brakes of this type, is actuated through the adjustable strut 25 by the primary shoe 12. The plunger 28 extends from a piston member (not shown) within the wheel cylinder 27, hydraulic fluid being delivered into the wheel cylinder from a conventional pedal operated master cylinder (not shown). Retraction springs 30 and 31 normally retain the ends 20 and 21 of the brake shoes in engagement with the anchor pin 22 when hydraulic pressure is released from the wheel cylinder 27. The brake shoes 12 and 13 are resiliently urged into engagement with the backing plate 11 by conventional spring assemblies 32 and 33. It will be obvious that while the invention is shown in connection with a uni-servo type brake it may be used with equal facility with other types of standard or conventional brakes.

The adjustable strut for adjusting the brake shoes, indicated generally by the reference character 25, comprises a rotatable part 35 having threaded portions 36 and 37 with the threads thereof extending in opposite directions. Tubular nut members 38 and 39 are provided with interior mating threads which mate with the threaded portions 36 and 37 so that rotation of the rotatable part 35 will move the tubular nuts 38 and 39 apart or toward one another, depending on the direction of rotation of the rotatable part 35. The ends 40 of the adjustable part 35 are bifurcated or slotted to receive ends 23 and 24 of the webs of the brake shoes, thus non-rotatably connecting the nut members 38 and 39 to the brake shoes.

The central portion of the rotatable member 35 is provided with a threaded portion 45. This threaded portion 45 is provided with helically extending buttress threads 45a. Buttress threads, as understood in the art, each comprise an inclined surface or ramp portion 46 and an abrupt portion or face 47; see FIGURE 7.

The reference character 50 indicates a floating housing which engages and slidably receives the tubular nuts 38 and 39. The housing 50 is provided with a laterally extending tubular extension 51 provided at its free end with a counterbore 52. Rigidly secured to the backing plate 11 is a pin or stud 53 which extends into the counterbore 52 to provide a substantial pin and slot connection between the backing plate 11 and the housing 50. This permits relative longitudinal movement of the housing 50 together with the adjustable strut 25 during the normal braking operation of the brakes. When, however, the pin 53 reaches the end of the counterbore 52, movement of the housing 50 is arrested and the adjustable strut 25 moves relatively thereto, if there is excessive movement of the brake shoes.

Slidably and if desired, nonrotatably, mounted in the tubular extension 51 is a pawl member or dog 60; see FIGURES 3, 4, 5 and 6. This pawl member is provided with a concave end face 61 provided with inclined buttress threads 62 which are inclined at the helix angle of the helical threaded portion 45 of the movable part 35 of the strut 25. The pawl member 60 is provided with a recess 63 to receive one end of a spring 64, the other end of which abuts against the end of the pin or stud 53. Thus, the pawl member 60 is biased in a direction toward the threaded portion 45 so that the buttress threads 62 thereon engage the buttress threads on the threaded portion 45, as shown diagrammatically in FIGURE 7.

By reference to FIGURE 7, the method of operation wherein adjustment of the brake shoes is accomplished will be described. When the strut member 25 partakes of endwise movement relative to the housing 50, it moves in the direction of the arrow A, whereupon the inclined or ramp surface 46 of the buttress threads 45 moves along corresponding ramp surfaces 62a on the pawl member 60. This axially displaces the pawl member 60 against the action of the spring 64 so as to disengage the mating buttress threads 45 and 62 as shown in dotted lines. Thereupon, upon re-engagement of the buttress threads 45 and 62, the threads on the pawl member 60 will pick up new threads on the strut member, there having been a relative sliding movement between the strut member 25 and the pawl member 60.

Thereafter, when the strut member 25 tends to return to its normal position and moves in the direction of the arrow B, the abrupt faces 47 of the buttress threads 45 will engage abrupt faces 62b of the buttress threads on the pawl member. Inasmuch as the buttress threads 45 and the threads 62 are arranged at a mating helix angle, the rotatable part 35 of the strut member will be rotated. This rotation of the rotatable part 35, through the threaded portions 36 and 37, moves the tubular nut portions 38 and 39 apart and adjusts the brake shoes.

In brakes of the type herein illustrated, the wear on the secondary shoe 13 is generally greater than that on the primary shoe 12 and this greater wear can be compensated for by providing the threads 37 with a greater pitch than the threads 36 so that upon each rotation of the rotatable member 35, the secondary shoe will be adjusted to a greater extent than the primary shoe 12.

From the foregoing, it will be understood that the dog or pawl member 60 picks up new threads on the threaded portion 45 of the rotatable member 35 during the application of the brakes when the brake shoes have been moved an excessive amount due to wear on the brake linings thereof. Then, when the brake shoes return to their normal positions of rest, the mating helical threads 45 and 62 will rotate the rotatable member 35 to cause an adjustment of the brake shoes. Due to the pin and slot connection 53–52 between the backing plate 11 and the housing 50, no adjustment will take place during the normal operation of the brakes, such adjustment occurring only upon excessive movement of the brake shoes due to wear on the break linings thereof.

From the foregoing description, it will be description, it will be apparent that there is provided a simple but effective means for positively adjusting the brakes whenever such adjustment is necessary due to excessive wear of the brake linings. The device comprises a minimum number of parts so that it may be economically manufactured, assembled and maintained. Also, by providing the threaded portion 37 with a greater pitch than that of the threaded portion 36, the secondary shoe may be adjusted to a greater extend due to the greater wear on the lining thereof.

While one commercially practical embodiment of the invention has been described and illustrated herein somewhat in detail, it will be understood that various changes may be made as may come within the purview of the accompanying claims.

What is claimed is:

1. A brake comprising, a pair of brake shoes having brake linings, a rotatable brake drum, means for moving said brake shoes into engagement with said brake drum, an adjustable strut connecting adjacent ends of said brake shoes and having a rotating part, helical threads on the rotating part of said strut, said threads each having an inclined side and an abrupt side, a pawl member provided with a concave end adapted to partially surround said strut and provided with mating threads engaging the threads on said strut throughout a portion of the circumference of said strut, and spring means for urging said pawl member toward said strut in a direction perpendicular thereto whereby, upon axial movement of said strut member in one direction, the inclined sides of said threads will axially displace said pawl member, whereby upon re-engagement, said pawl member will pick up a new thread on said strut, movement of said strut member in the opposite direction causing the abrupt sides of said threads to rotate said rotating part.

2. A brake comprising, a pair of brake shoes having brake linings, a rotatable brake drum, means for moving said brake shoes into engagement with said brake drum, a backing plate, an adjustable strut connecting adjacent ends of said brake shoes and comprising a rotatable part, a floating housing enclosing said rotatable part, a laterally extending tubular extension on said housing, a pin and slot connection between said tubular extension and said backing plate permitting limited movement of said housing and adjustable strut as a unit during the normal operation of the brakes, helical buttress threads on the rotatable part of said strut, and a spring biased pawl member slidably mounted in said tubular extension provided with mating threads engaging the threads on said rotatable part whereby excessive axial movement of said strut in one direction due to wear on said linings will cause a relative movement between said housing and strut to displace said pawl member whereby, upon re-engagement, said pawl member will pick up a new thread on said rotatable part, movement of said strut member in the opposite direction causing the mating buttress threads on said pawl member and rotatable part to rotate the latter to adjust the brake shoes.

3. A brake comprising, a pair of brake shoes having brake linings, a rotatable brake drum, means for moving said brake shoes into engagement with said brake drum, a backing plate, an adjustable strut comprising a rotatable member having threads thereon, and a pair of nuts engaging said threads and nonrotatably connected to the adjacent ends of the brake shoes, helical buttress threads on said rotatable member, a floating housing surrounding said adjustable strut, a laterally extending tubular portion on said housing having a counterbore at its free end, a pin fixed to said backing plate and loosely engaging said counterbore, permitting limited movement of said housing and adjustable strut as a unit during normal operation of the brakes, and a spring biased pawl member slidably mounted in said tubular portion provided with mating threads engaging the buttress threads on the rotatable member whereby excessive axial movement of said strut member in one direction due to wear on the brake linings will cause a relative movement between said housing and strut to displace said pawl member sufficiently whereby, upon re-engagement, said pawl member will pick up a new thread on said rotatable part whereupon movement of said strut member in the opposite direction will cause said mating buttress threads to rotate said rotatable part to adjust the brakes.

4. A brake comprising, a pair of brake shoes having brake linings, a rotatable brake drum, means for moving said brake shoes into engagement with said brake drum, a backing plate, an adjustable strut comprising a rotatable member having threads thereon, and a pair of nuts engaging said threads and nonrotatably connected to the adjacent ends of the brake shoes, helical buttress threads on said rotatable member, a housing slidably receiving said strut, a laterally extending tubular portion on said housing, a pin and slot connection between said tubular portion and said backing plate permitting limited movement of said housing and adjustable strut as a unit during the normal operation of the brakes, said adjustable strut moving relative to said housing upon excessive axial movement of said strut member in one direction due to wear on the brake linings, and a spring biased pawl member slidably mounted in said tubular portion provided with mating threads engaging the buttress threads on the rotatable member whereby excessive axial movement of said strut member in one direction due to wear on the brake linings will displace said pawl member sufficiently whereby, upon re-engagement, said pawl member will pick up a new thread on said rotatable part whereupon movement of said strut member in the opposite direction will cause said mating buttress threads to rotate said rotatable part to adjust the brakes.

References Cited by the Examiner

UNITED STATES PATENTS

| | | | |
|---|---|---|---|
| 495,191 | 4/93 | Thompson | 188—196 |
| 2,152,041 | 3/39 | Goepfrich | 188—79.5 |
| 2,173,582 | 9/39 | Fisher | 188—79.5 |
| 3,068,964 | 12/62 | Williams et al. | 188—79.5 |

FOREIGN PATENTS 675,244  10/29  France.

ARTHUR L. LA POINT, *Primary Examiner.*

DUANE A. REGER, *Examiner.*